United States Patent
Wang et al.

(10) Patent No.: US 11,412,170 B2
(45) Date of Patent: Aug. 9, 2022

(54) IMAGE SENSOR AND IMAGE SENSING METHOD

(71) Applicant: Guangzhou Tyrafos Semiconductor Technologies Co., LTD, Guangzhou (CN)

(72) Inventors: Jia-Shyang Wang, Miaoli County (TW); Ping-Hung Yin, Taipei (TW)

(73) Assignee: Guangzhou Tyrafos Semiconductor Technologies Co., LTD, Guangzhou (CN)

(*) Notice: Subject to any disclaimer, the term of this patent is extended or adjusted under 35 U.S.C. 154(b) by 0 days.

(21) Appl. No.: 17/465,788

(22) Filed: Sep. 2, 2021

(65) Prior Publication Data

US 2022/0150432 A1    May 12, 2022

Related U.S. Application Data

(60) Provisional application No. 63/110,370, filed on Nov. 6, 2020.

(51) Int. Cl.
   H04N 5/355    (2011.01)
   H04N 5/3745   (2011.01)
   H04N 5/378    (2011.01)
   G05F 1/56     (2006.01)

(52) U.S. Cl.
   CPC ............ *H04N 5/378* (2013.01); *G05F 1/56* (2013.01); *H04N 5/35572* (2013.01); *H04N 5/37452* (2013.01); *H04N 5/37457* (2013.01)

(58) Field of Classification Search
   None
   See application file for complete search history.

(56) References Cited

U.S. PATENT DOCUMENTS

2018/0295298 A1* 10/2018 Zamir .................. H04N 5/3535

* cited by examiner

*Primary Examiner* — Mark T Monk
(74) *Attorney, Agent, or Firm* — JCIPRNET

(57) ABSTRACT

An image sensor and an image sensing method are provided. The image sensor includes a photodiode, a first storage circuit, a first readout circuit, a second storage circuit, and a second readout circuit. When the image sensor is operated in a dynamic vision sensing mode, the first storage circuit stores a first dynamic vision sensing signal provided by the photodiode during a first exposure period of a first frame period, and the second storage circuit stores a second dynamic vision sensing signal provided by the photodiode during a second exposure period of the first frame period. The first readout circuit and the second readout circuit output a first readout signal and a second readout signal to a first input terminal and a second input terminal of a differential amplifier at the same time according to the first dynamic vision sensing signal and the second dynamic vision sensing signal.

20 Claims, 7 Drawing Sheets

IMAGE SENSOR AND IMAGE SENSING METHOD

CROSS-REFERENCE TO RELATED APPLICATION

This application claims the priority benefit of U.S. application Ser. No. 63/110,370, filed on Nov. 6, 2020. The entirety of the above-mentioned patent application is hereby incorporated by reference herein and made a part of this specification.

BACKGROUND

Technical Field

The disclosure relates to a sensor, and in particular to an image sensor and an image sensing method.

Description of Related Art

For a current image sensor to realize dynamic vision sensing and image sensing, two sets of sensing arrays or two sets of readout circuits are required, which require a higher hardware cost and a complicated circuit design. In addition, dynamic vision sensing results obtained by the current image sensor often has a high distortion, resulting in a poor dynamic vision sensing effect. Therefore, several embodiments of solutions for realizing an image sensor with a lower hardware cost and obtaining dynamic vision sensing results and image sensing results with lower distortion will be proposed as follows.

SUMMARY

The disclosure provides an image sensor and an image sensing method, which effectively sense high-speed moving objects without image distortion.

An image sensor of the disclosure includes a photodiode, a first storage circuit, a first readout circuit, a second storage circuit, and a second readout circuit. The first storage circuit is coupled to the photodiode. The first readout circuit is coupled to the first storage circuit and another second storage circuit of a previous-level sensing pixel. The second storage circuit is coupled to the photodiode. The second readout circuit is coupled to the second storage circuit and another first storage circuit of a next-level sensing pixel. When the image sensor is operated in a dynamic vision sensing mode, the first storage circuit stores a first dynamic vision sensing signal provided by the photodiode during a first exposure period of a first frame period, and the second storage circuit stores a second dynamic vision sensing signal provided by the photodiode during a second exposure period of the first frame period. The first readout circuit and the second readout circuit output a first readout signal and a second readout signal to a first input terminal and a second input terminal of a differential amplifier at the same time according to the first dynamic vision sensing signal and the second dynamic vision sensing signal.

An image sensing method of the disclosure includes the following. When an image sensor is operated in a dynamic vision sensing mode, a first dynamic vision sensing signal provided by a photodiode during a first exposure period of a first frame period is stored through a first storage circuit. A second dynamic vision sensing signal provided by the photodiode during a second exposure period of the first frame period is stored through a second storage circuit. A first readout signal and a second readout signal are output to a first input terminal and a second input terminal of a differential amplifier at the same time according to the first dynamic vision sensing signal and the second dynamic vision sensing signal through a first readout circuit and a second readout circuit. The first readout circuit is coupled to the first storage circuit and another second storage circuit of a previous-level sensing pixel. The second readout circuit is coupled to the second storage circuit and another first storage circuit of a next-level sensing pixel.

Based on the above, the image sensor and the image sensing method of the disclosure store the first dynamic vision sensing signal and the second dynamic vision sensing signal of two consecutive sensing results of the photodiode in a frame period through two storage circuits, and read out the first dynamic vision sensing signal and the second dynamic vision sensing signal as differential signals, in order to effectively obtain dynamic vision sensing information.

To provide a further understanding of the above features and advantages of the disclosure, embodiments accompanied with drawings are described below in details.

DESCRIPTION OF THE EMBODIMENTS

Figure 1:
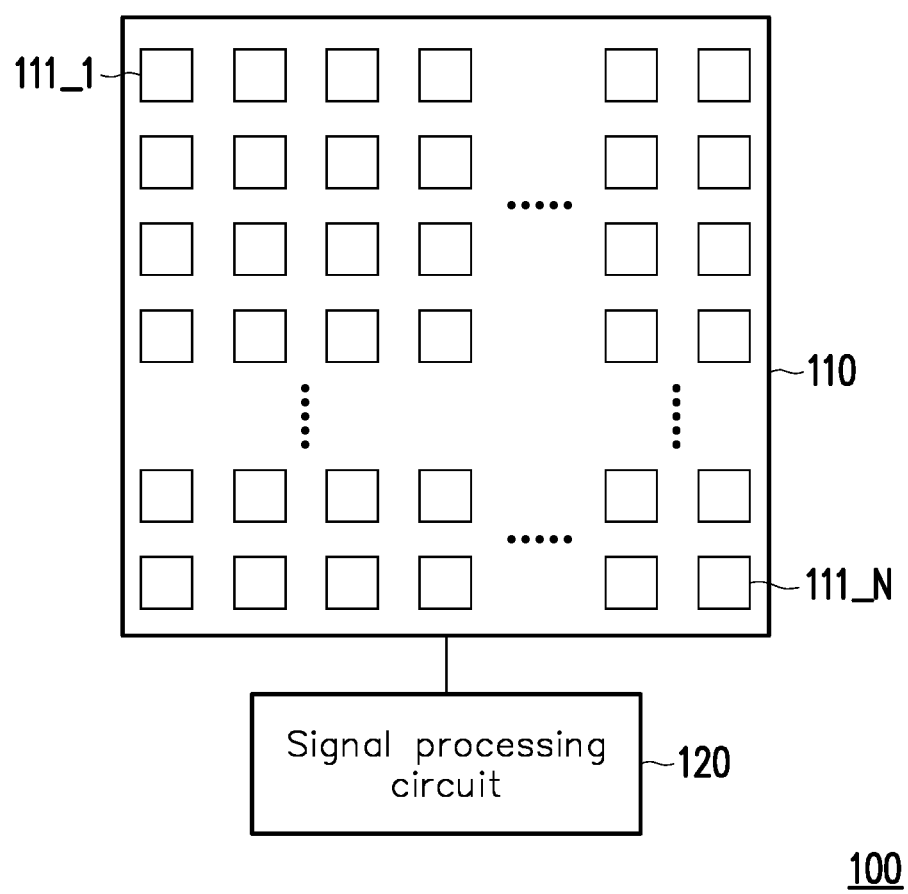
FIG. 1 is a schematic diagram of an image sensor according to an embodiment of the disclosure.

To provide a further understanding of the content of the disclosure, embodiments as examples of how this disclosure may be implemented are described below. In addition, wherever possible, elements/components/steps with the same reference numeral in the drawings and embodiments represent the same or similar components.

FIG. 1 is a schematic diagram of an image sensor according to an embodiment of the disclosure. Referring to FIG. 1, an image sensor 100 includes a pixel array 110 and a signal processing circuit 120. The pixel array 110 is coupled to the signal processing circuit 120. The pixel array 110 includes a plurality of sensing pixels 111_1 to 111_N, where N is a positive integer. Each of the sensing pixels 111_1 to 111_N may be used as a pixel or a sub-pixel. In this embodiment, the image sensor 100 may perform a dynamic vision sensing mode and a (color) image sensing mode.

Figure 2:
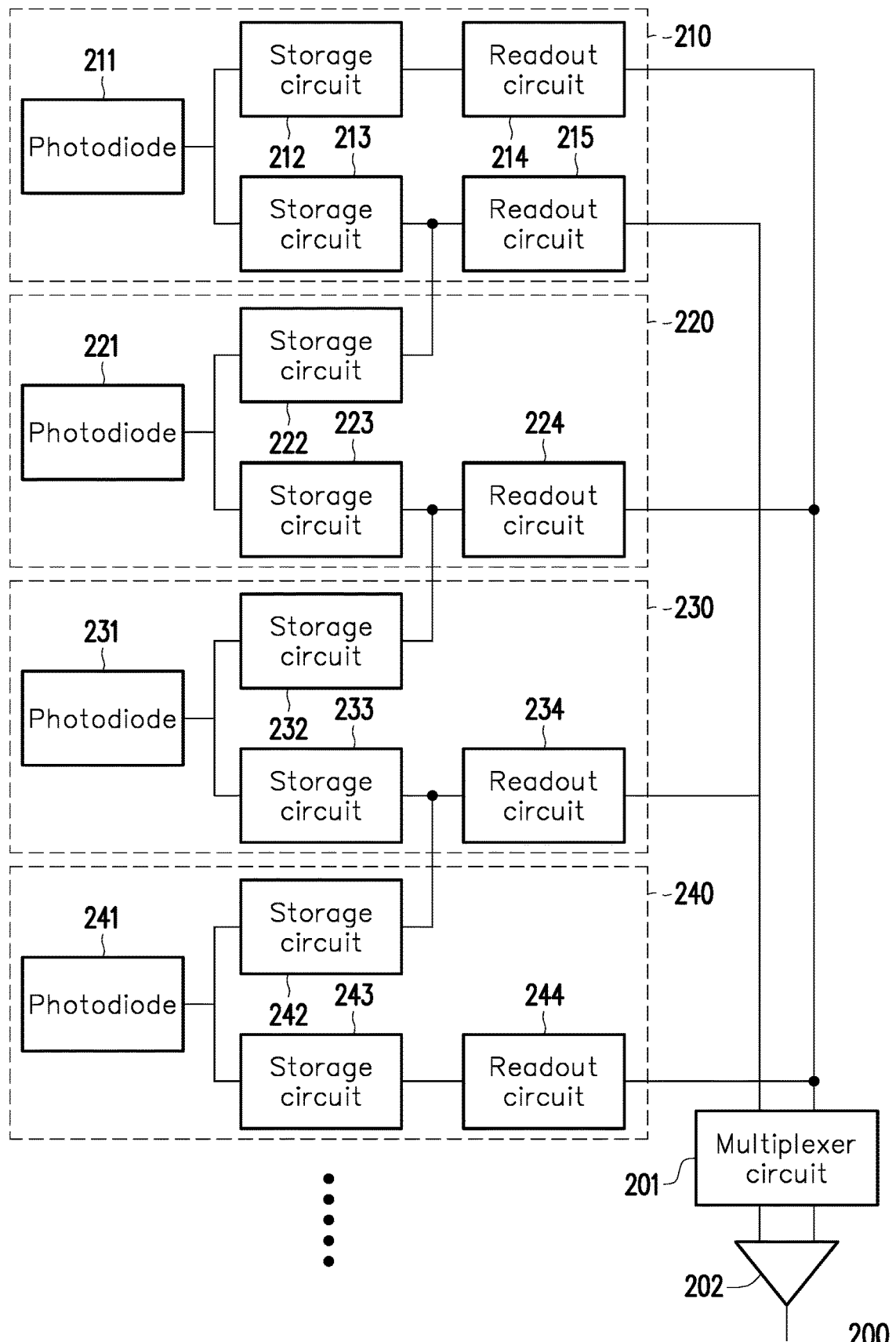
FIG. 2 is a schematic diagram of a sensing pixel according to an embodiment of the disclosure.

FIG. 2 is a schematic diagram of a sensing pixel according to an embodiment of the disclosure. Referring to FIG. 2, the sensing pixels 111_1 to 111_N of FIG. 1 may include a sensor pixel circuit 200 shown in FIG. 2, and the signal processing circuit 120 of FIG. 1 may include a multiplexer circuit 201 and a differential amplifier 202 shown in FIG. 2. In this embodiment, a sensing pixel 210 (for example, the sensing pixel 111_1 in FIG. 1) includes a photodiode 211, a storage circuit 212, a storage circuit 213, a readout circuit 214, and a readout circuit 215. The photodiode 211 is coupled to the storage circuit 212 and the storage circuit 213. The storage circuit 212 is coupled to the readout circuit 214. The storage circuit 213 is coupled to the readout circuit 215. In this embodiment, the sensing pixel 220 (for example, the sensing pixel 111_2 in FIG. 1) includes a photodiode 221, a storage circuit 222, a storage circuit 223, a readout circuit 215, and a readout circuit 224. The photodiode 221 is coupled to the storage circuit 222 and the storage circuit 223. The storage circuit 222 is coupled to the readout circuit 215. The storage circuit 223 is coupled to the readout circuit 224. It is worth noting that the sensing pixel 210 (such as the sensing pixel 111_1 in FIG. 1) and the sensing pixel 220 (such as the sensing pixel 111_2 in FIG. 1) share the same readout circuit 215. In this embodiment, the sensing pixel 230 (for example, the sensing pixel 111_3 in FIG. 1) includes a photodiode 231, a storage circuit 232, a storage circuit 233, a readout circuit 224, and a readout circuit 234. The photodiode 231 is coupled to the storage circuit 232 and the storage circuit 233. The storage circuit 232 is coupled to the readout circuit 224. The storage circuit 233 is coupled to the readout circuit 234. It is worth noting that the sensing pixel 220 (such as the sensing pixel 111_2 in FIG. 1) and the sensing pixel 230 (such as the sensing pixel 111_3 in FIG. 1) share the same readout circuit 224. The sensing pixel 240 (for example, the sensing pixel 111_4 in FIG. 1) includes a photodiode 241, a storage circuit 242, a storage circuit 243, a readout circuit 234, and a readout circuit 244. By analogy, the sensing pixel 240 has the same circuit characteristics and operation method as the aforementioned sensing pixels 220 and 230. In other words, except for the two readout circuits used by the first sensing pixel of each column and the last sensing pixel of each column of the sensing pixels 111_1 to 111_N in FIG. 1, which may include one readout circuit individually used (such as the readout circuit 214), the two readout circuits used by the remaining sensing pixels are shared with an previous-level sensing pixel and a next-level sensing pixel. In other words, for sensing pixels 220, 230, and 240, the readout circuits 215, 224, and 234 of the sensing pixels 220, 230, and 240 are coupled to the storage circuits 222, 232, and 242 of the sensing pixels 220, 230, and 240 and the storage circuits 213, 223, and 233 of the previous-level sensing pixels 210, 220, and 230. The readout circuits 224, 234, and 244 of the sensing pixels 220, 230, and 240 are coupled to the storage circuits 223, 233, and 243 of the sensing pixels 220, 230, and 240 and the storage circuits 232 and 242 of the next-level sensing pixels 230 and 240.

It should be noted that the readout circuit 214, the readout circuit 224, and the readout circuit 244 are coupled to a first input terminal of the multiplexer circuit 201, and the readout circuit 215 and the readout circuit 234 are coupled to a second input terminal of the multiplexer circuit 201. A first output terminal of the multiplexer circuit 201 is coupled to a first input terminal of the differential amplifier 202, and a second output terminal of the multiplexer circuit 201 is coupled to a second input terminal of the differential amplifier 202. The multiplexer circuit 201 may selectively provide the readout signal output by the readout circuit 214, the readout circuit 224 or the readout circuit 244 to the first input terminal or second input terminal of the differential amplifier 202, and the multiplexer circuit 201 may selectively provide the readout signal output by the readout circuit 215 or the readout circuit 234 to the second input terminal or the first input terminal of the differential amplifier 202.

In this embodiment, when the image sensor is operated in the dynamic vision sensing mode, the sensing pixel 210 may use the storage circuit 212 and the storage circuit 213 to store two dynamic vision sensing signals generated after two exposures of the photodiode 211 in a short time. Specifically, the storage circuits 212, 222, 232, and 242 may store a first dynamic vision sensing signal provided by the photodiodes 211, 221, 231, and 241 during a first exposure period of a frame period, and the storage circuits 213, 223, 233, and 243 may store a second dynamic vision sensing signal provided by the photodiodes 211, 221, 231, and 241 during a second exposure period of the frame period. In a first reading period, the readout circuit 214 and readout circuit 215 of the sensing pixel 210 may output a first readout signal and a second readout signal to the first input terminal and the second input terminal of the differential amplifier 202 (via the multiplexer circuit 201) at the same time based on the first dynamic vision sensing signal stored by the storage circuit 212 and the second dynamic vision sensing signal stored by the storage circuit 213 (combined with up and down ramp signals). Next, during a next first readout period, the sensing pixel 220 may output another first readout signal and another second readout signal to the second input terminal and the first input terminal of the differential amplifier 202 (exchanged via the multiplexer circuit 201) at the same time through the readout circuit 215 and the readout circuit 224 according to another first dynamic vision sensing signal stored by the storage circuit 222 and another second dynamic vision sensing signal stored by the storage circuit 223 (combined with up and down ramp signals). By analogy, combined with the switch of the multiplexer circuit 201, the first dynamic vision sensing signal and the second dynamic vision sensing signal respectively stored by the sensing pixel 230 and the sensing pixel 240 may be sequentially read out to the differential amplifier 202 by a plurality of shared readout circuits (combined with up and down ramp signals).

Therefore, in this embodiment, the readout circuit 214 and the readout circuit 215 may respectively read out the two dynamic vision sensing signals stored in the storage circuit 212 and the storage circuit 213, and the two dynamic vision sensing signals are provided to the differential amplifier 202 via the multiplexer circuit 201 so that the differential amplifier 202 may generate a dynamic vision sensing result corresponding to the sensing pixel. In this embodiment, the dynamic vision sensing result may refer to the signal intensity difference corresponding to the two dynamic vision sensing signals. In this way, the image sensor may obtain dynamic information of a current sensed object, such as displacement information and/or movement velocity information, etc. according to a plurality of dynamic vision sensing results corresponding to a sensing image (or corresponding to a frame period) generated by the sensing pixels 111_1 to 111_N of the sensing array 110 as shown in FIG. 1, but the disclosure is not limited thereto.

It is worth mentioning that in this embodiment, in a plurality of consecutive frame periods, the image sensor may be operated in the dynamic vision sensing mode and the image sensing mode alternately. Therefore, the complete information about the sensed object, that is, the velocity and image of the sensed object, may be obtained.

In this embodiment, when the image sensor is operated in the image sensing mode, the sensing pixel 210 may use the storage circuit 212 or the storage circuit 213 to store the image sensing signal generated by the photodiode 211 after one exposure in one frame period. In this embodiment, the readout circuit 214 and the readout circuit 215, combined with up and down ramp signals, may read out two sensing signals stored in the storage circuit 212 and the second storage circuit 213, and provide the two sensing signals to the differential amplifier 202, so that the differential amplifier 202 may generate the image sensing result corresponding to this sensing pixel. In this embodiment, the differential amplifier 202 may output the image sensing result from which the background (noise) information is removed according to the two sensing signals read out by the up and down ramp signals used by the readout circuit 214 and the readout circuit 215. In this way, the image sensor may generate a sensing image with low background noise according to the sensing pixels 111_1 to 111_N of the sensing array 110 as shown in FIG. 1.

Specifically, the sensing pixel 210 reads out a first image sensing signal and a reference signal stored by the storage circuit 212 of the sensing pixel 210 in a readout period respectively through the readout circuit 214 and the readout circuit 215, and the sensing pixel 220 outputs a third readout signal and a fourth readout signal to the first input terminal and second input terminal of the differential amplifier 202 through the readout circuit 215 and the readout circuit 224 during a next first readout period respectively according to another first image sensing signal and another reference signal stored by the storage circuit 222 of the sensing pixel 220 (combined with up and down ramp signals).

In addition, the storage circuit 213 of the sensing pixel 210 may store the next first image sensing signal provided by the photodiode 211 during the next exposure period in the next frame period, and the storage circuit 212 is in an idle state. The readout circuit 214 and the readout circuit 215 output the next third readout signal and the next fourth readout signal to the second input terminal and first input terminal of the differential amplifier 202 (exchanged via the multiplexer circuit) at the same time according to the next reference signal and the next first image sensing signal (combined with up and down ramp signals). It is worth noting that the next exposure period in the next frame period may not overlap with the readout period in the current frame period. Alternatively, the next exposure period in the next frame period may overlap with the readout period in the current frame period.

Figure 3:
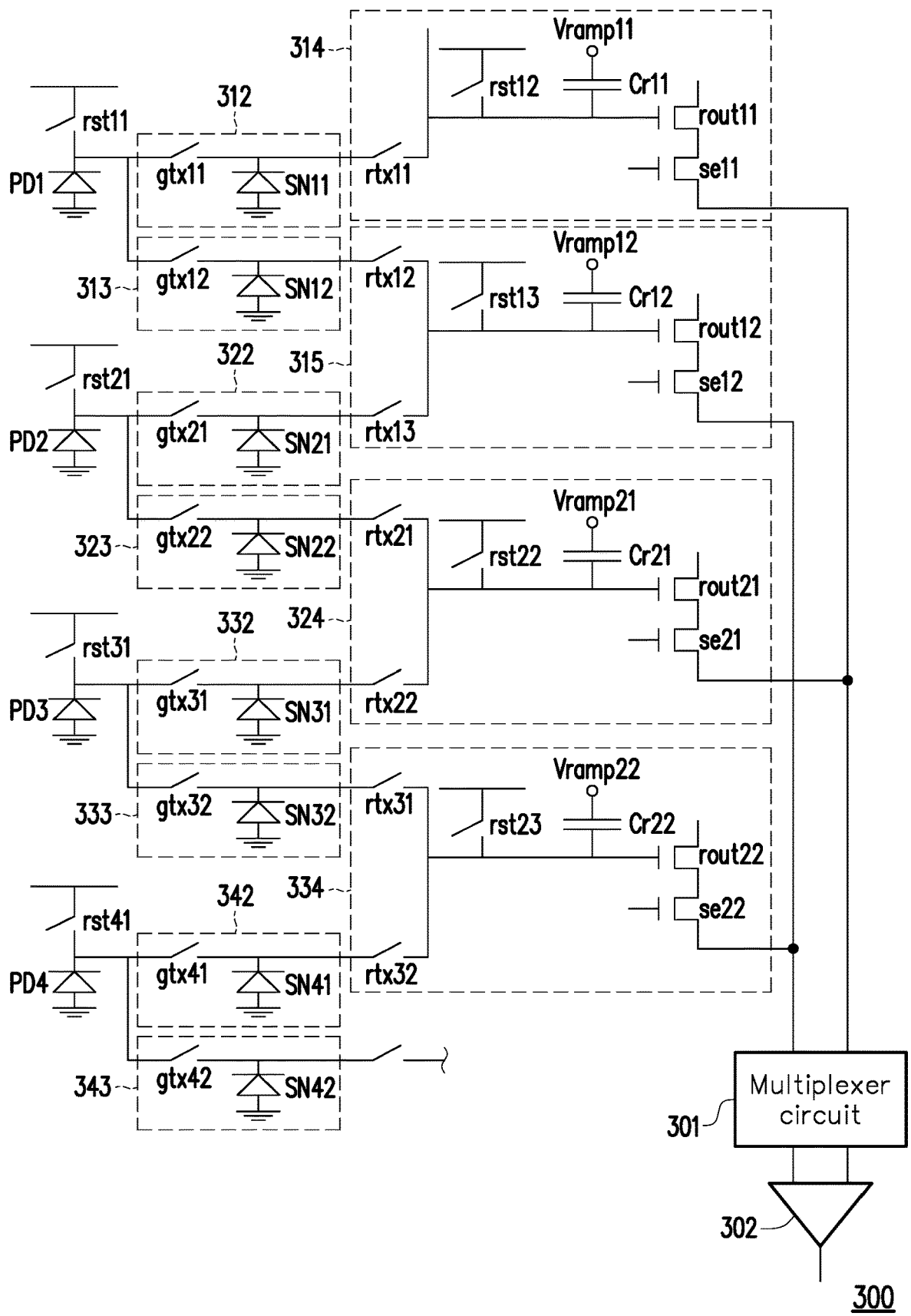
FIG. 3 is a schematic circuit diagram of a plurality of sensing pixels according to an embodiment of the disclosure.

FIG. 3 is a schematic circuit diagram of a plurality of sensing pixels according to an embodiment of the disclosure. Referring to FIG. 3, a sensor pixel circuit 300 of this embodiment is used to illustrate the sensing circuit configuration of a plurality of sensing pixels. In this embodiment, photodiodes PD1 to PD4 respectively belong to different sensing pixels adjacent to each other. A first terminal of a reset switch rst11 is coupled to a reset signal. The photodiode PD1 is coupled to a second terminal of the reset switch rst11, a storage circuit 312, and a storage circuit 313. A first terminal of a reset switch rst21 is coupled to the reset signal. The photodiode PD2 is coupled to a second terminal of the reset switch rst21, a storage circuit 322 and a storage circuit 323. A first terminal of a reset switch rst31 is coupled to the reset signal. The photodiode PD3 is coupled to a second terminal of the reset switch rst31, a storage circuit 332, and a storage circuit 333. A first terminal of a reset switch rst41 is coupled to the reset signal. The photodiode PD4 is coupled to a second terminal of the reset switch rst41, a storage circuit 342, and a storage circuit 343. The storage circuit 312 is coupled to a readout circuit 314. The storage circuit 313 is coupled to a readout circuit 315. The storage circuit 322 is coupled to the readout circuit 315. The storage circuit 323 is coupled to a readout circuit 324. The storage circuit 332 is coupled to the readout circuit 324. The storage circuit 333 is coupled to a readout circuit 334. The storage circuit 342 is coupled to the readout circuit 334. In other words, the readout circuits 315, 324, and 334 are respectively shared by two storage circuits adjacent to each other, and the configuration of other sensing pixels, storage circuits, and readout circuits in the pixel array may be deduced by analogy.

In this embodiment, the storage circuit 312 includes an output switch gtx11 and a storage unit SN11. The storage circuit 313 includes an output switch gtx12 and a storage unit SN12. The storage circuit 322 includes an output switch gtx21 and a storage unit SN21. The storage circuit 323 includes an output switch gtx22 and a storage unit SN22. The storage circuit 332 includes an output switch gtx31 and a storage unit SN31. The storage circuit 333 includes an output switch gtx32 and a storage unit SN32. The storage circuit 342 includes an output switch gtx41 and a storage unit SN41. The storage circuit 343 includes an output switch gtx42 and a storage unit SN42. In this embodiment, a first terminal of the output switch gtx11 of the storage circuit 312 is coupled to the photodiode PD1. The storage unit SN11 of the storage circuit 312 is coupled to a second terminal of the output switch gtx11. In this embodiment, the coupling relationship of internal elements of the storage circuits 313, 322, 323, 332, 333, 342, and 343 are the same as that of the storage circuit 312, which will not be repeated herein. In this embodiment, the storage units SN11, SN12, SN21, SN22, SN31, SN32, SN41, and SN42 may respectively be a capacitor or an unlighted photodiode, but the disclosure is not limited thereto.

In this embodiment, the readout circuit 314 includes an output switch rtx11, a readout switch rout11, a selective switch se11, a reset switch rst12, and a ramp capacitor Cr11. A first terminal of the reset switch rst12 is coupled to another reset signal. A first terminal of the ramp capacitor Cr11 is coupled to a ramp signal Vramp11. The readout circuit 315 includes an output switch rtx12, an output switch rtx13, a readout switch rout12, a selective switch se12, a reset switch rst13, and a ramp capacitor Cr12. A first terminal of the reset switch rst13 is coupled to another reset signal. A first terminal of the ramp capacitor Cr12 is coupled to a ramp signal Vramp12. The readout circuit 324 includes an output switch rtx21, an output switch rtx22, a readout switch rout21, a selective switch se21, a reset switch rst22, and a ramp capacitor Cr21. A first terminal of the reset switch rst22 is coupled to another reset signal. A first terminal of the ramp capacitor Cr21 is coupled to a ramp signal Vramp21. The readout circuit 334 includes an output switch rtx31, an output switch rtx32, a readout switch rout22, a selective switch se22, a reset switch rst23, and a ramp capacitor Cr22. A first terminal of the reset switch rst23 is coupled to another reset signal. A first terminal of the ramp capacitor Cr22 is coupled to a ramp signal Vramp22.

In this embodiment, a first terminal of the output switch rtx11 of the readout circuit 314 is coupled to the storage unit SN11. A control terminal of the readout switch rout11 of the readout circuit 314 is coupled to a second terminal of the output switch rtx11. A first terminal of the selective switch se11 of the readout circuit 314 is coupled to a first terminal of the readout switch rout11. A second terminal of the reset switch rst12 of the readout circuit 314 is coupled to the second terminal of the output switch rtx11. A second terminal of the ramp capacitor Cr11 is coupled to the second terminal of the output switch rtx11. In this embodiment, a first terminal of the output switch rtx12 of the readout circuit 315 is coupled to the storage unit SN12. A first terminal of the output switch rtx13 of the readout circuit 315 is coupled to the storage unit SN21. A control terminal of the readout switch rout12 of the readout circuit 315 is coupled to a second terminal of the output switch rtx12 and a second terminal of the output switch rtx13. A first terminal of the selective switch se12 of the readout circuit 315 is coupled to a first terminal of the readout switch rout12. A second terminal of the reset switch rst13 of the readout circuit 315 is coupled to the second terminal of the output switch rtx12 and the second terminal of the output switch rtx13. A second terminal of the ramp capacitor Cr12 is coupled to the second terminal of the output switch rtx12 and the second terminal of the output switch rtx13.

In this embodiment, the coupling relationship of internal elements of the readout circuits 315, 324, and 334 is the same as that of the readout circuit 314, which will not be repeated herein. The coupling relationship between the storage units SN21, SN22, SN31, SN32, SN41, SN42 and the readout circuits 315, 324, and 334 may be the same as the coupling method of the storage unit SN11 and the storage unit SN12 with the readout circuit 314 and the readout circuit 315 as described above, which will not be repeated herein. It is worth noting that second terminals of the selective switch se11 and the selective switch se21 are coupled to a first input terminal of the multiplexer circuit 301, and second terminals of the selective switch se12 and the selective switch se22 are coupled to a second input terminal of the multiplexer circuit 301. A first output terminal of the multiplexer circuit 301 is coupled to a first input terminal of the differential amplifier 302, and a second output terminal of the multiplexer circuit 301 is coupled to a second input terminal of the differential amplifier 302. The multiplexer circuit 301 may selectively provide the readout signal output by the selective switch se11 or the selective switch se21 to the first input terminal or the second input terminal of the differential amplifier 302, and the multiplexer circuit 301 may selectively provide the readout signals output by the selective switch se12 and the selective switch se22 to the second input terminal or the first input terminal of the differential amplifier 302.

Figure 4:
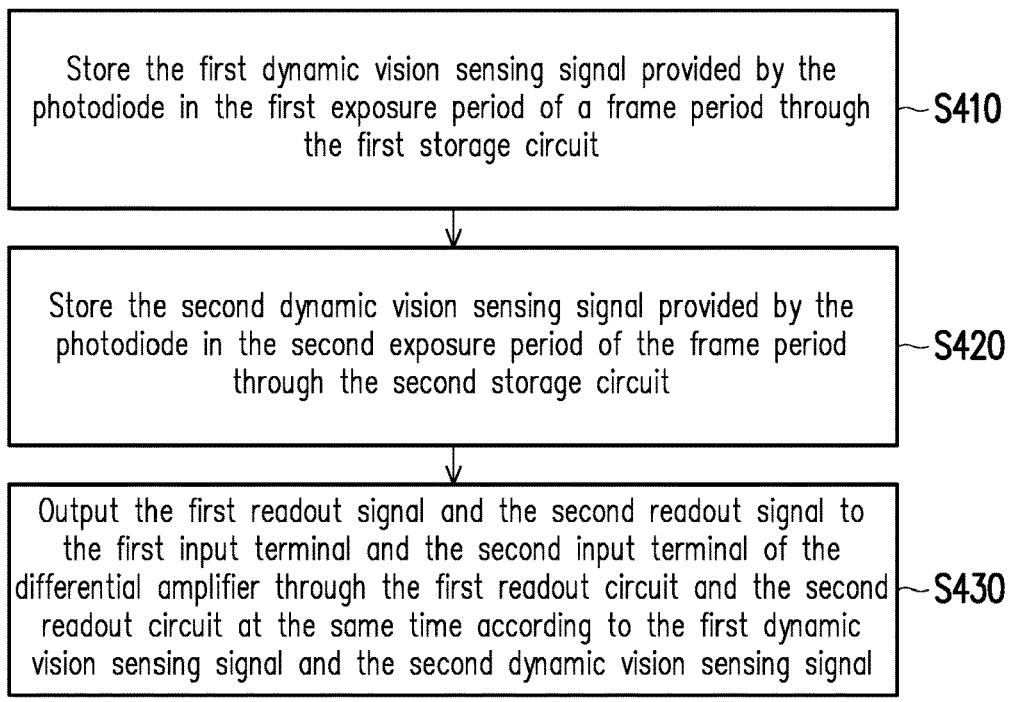
FIG. 4 is a flow chart of an image sensing method according to the first embodiment of the disclosure.
Figure 5:
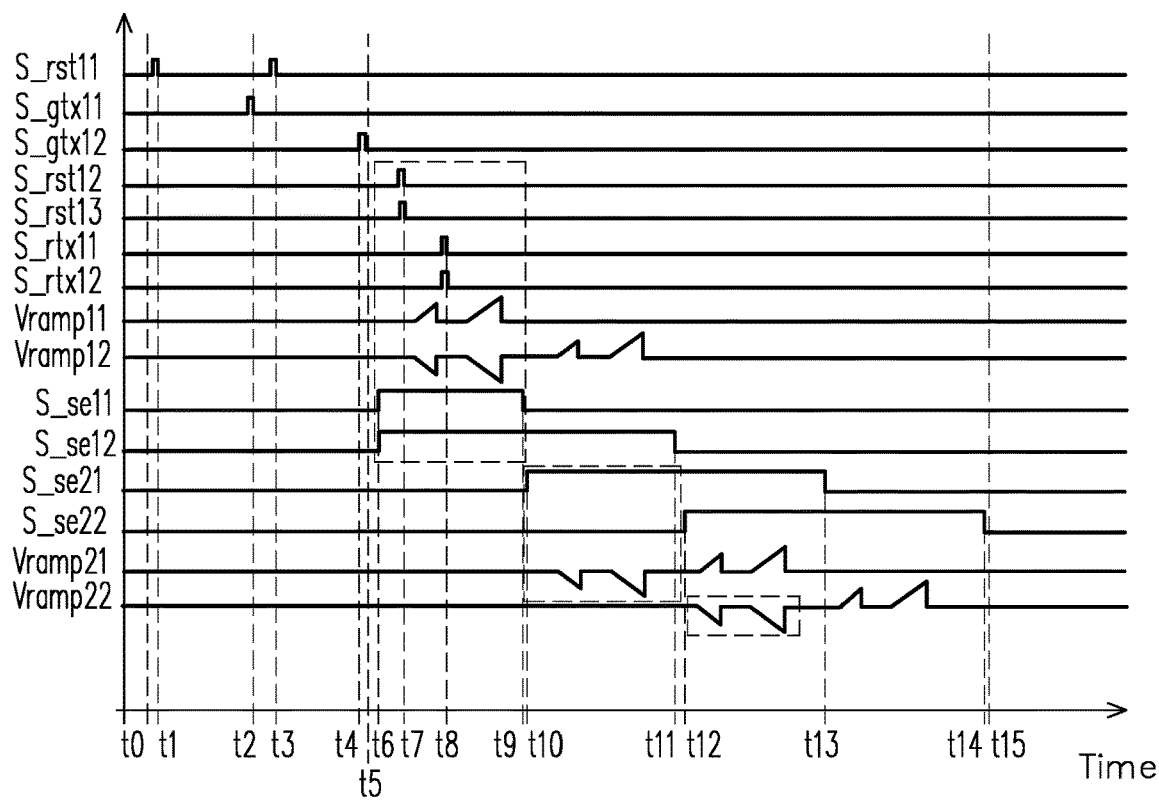
FIG. 5 is a signal time sequence diagram of a plurality of signals according to the first embodiment of the disclosure.

FIG. 4 is a flow chart of an image sensing method according to the first embodiment of the disclosure. FIG. 5 is a signal time sequence diagram of a plurality of signals according to the first embodiment of the disclosure. Referring to FIGS. 3 to 5, the following description takes the operation of the photodiode PD1, the storage circuit 312, the storage circuit 313, the readout circuit 314, and the readout circuit 315 as an example, and the operation of all sensing pixels of the image sensor may be deduced by analogy. The output switch gtx11, the output switch gtx12, the output switch rtx11, the output switch rtx12, the reset switch rst11, the reset switch rst12, the reset switch rst13, the selective switch se11, and the selective switch se12 may be operated with time sequences S_rst11, S_gtx11, S_gtx12, S_rst12, S_rst13, S_rtx11, S_rtx12, S_se11, and S_se12 as shown in FIG. 5. It is worth noting that FIG. 5 only shows part of the operational time sequences of the image sensor, while the switching signal of other switches and other signal time sequences may be deduced by analogy. The operational time sequences adapted for the image sensor of the disclosure are not limited to FIG. 5.

In step S410, the image sensor may store the first dynamic vision sensing signal provided by the photodiode PD1 during the first exposure period of a frame period through the storage circuit 312. In step S420, the image sensor may store the second dynamic vision sensing signal provided by the photodiode PD1 during the second exposure period of the frame period through the storage circuit 313. In step S430, the image sensor may output the first readout signal and the second readout signal to the first input terminal and the second input terminal of the differential amplifier through the readout circuit 314 and the readout circuit 315 at the same time according to the first dynamic vision sensing signal and the second dynamic vision sensing signal. It is worth noting that the above steps S410 to S430 may be executed repeatedly for other sensing pixels.

Specifically, in this embodiment, when the image sensor is operated in the dynamic vision sensing mode, according to the time sequences S_rst11, S_gtx11, and S_gtx12, the photodiode PD1 is exposed twice at times t1 and t3, respectively (the photodiodes PD2 to PD4 are also exposed twice at the same time according to the time sequences S_rst11, S_gtx11, and S_gtx12), and the two exposure operations of the photodiode PD1 are respectively read out at times t2 and t4 to be stored to the storage unit SN11 and the storage unit SN12. The output switches gtx11, gtx21, gtx31, and gtx41 may receive the same switch signal and be operated with the same time sequence S_gtx11. The output switches gtx12, gtx22, gtx32, and gtx42 may receive the same switch signal and be operated with the same time sequence S_gtx12. Therefore, the storage unit SN11 of the storage circuit 311 stores the first dynamic vision sensing signal provided by the photodiode PD1 during the first exposure period (the time t1 to the time t2) of a frame period (a time t0 to a time t15), and the storage circuit 312 stores the second dynamic vision sensing signal provided by the photodiode PD1 during the second exposure period (the time t3 to the time t4) of the frame period (the time t0 to the time t15). Next, according to the time sequences S_rst12, S_rst13, S_rtx11, and S_rtx12, the potential of the floating diffusion (FD) node on the signal readout path of the readout circuits 314 and 315 may be reset at a time t7, and the ramp signal Vramp11 and the ramp signal Vramp12 respectively have small up-ramp waveforms and down-ramp waveforms respectively between the time t7 and a time t8. Next, the information stored in the storage unit SN11 and the storage unit SN12 may be read out at the time t8. In this regard, the time sequences S_se11 and S_se12 are in an ON-state from a time t6 to a time t9; therefore, the readout circuit 314 and the readout circuit 315 may output the first readout signal and the second readout signal to the first input terminal and second input terminal of the differential amplifier at the same time based on the first dynamic vision sensing signal and the second dynamic vision sensing signal. The readout circuit 314 may output the first readout signal according to the up ramp signal (the ramp signal Vramp11) and the first dynamic vision sensing signal, and the readout circuit 315 may output the second readout signal according to the down ramp signal (the ramp signal Vramp12) and the second dynamic vision sensing signal. Therefore, the comparison result of the first dynamic vision sensing signal and the second dynamic vision sensing signal provided by the photodiode PD1 may be effectively read out to the later signal processing circuit for analysis to generate the dynamic vision sensing information corresponding to the sensing pixel of the photodiode PD1.

Next, regarding the two exposure results of the photodiode PD2, according to the time sequences S_se12 and S_se21 being in an ON-state from a time t10 to a time t11, combined with the ramp signal Vramp12 which is converted to the up ramp signal from the time t10 to the time t11 and the ramp signal Vramp21 which is the down ramp signal from the time t10 to the time t11, the readout circuit 315 and the readout circuit 324 may respectively read out the first dynamic vision sensing signal and the second dynamic vision sensing signal provided by the photodiode PD2 from the time t10 to the time t11 to generate the dynamic vision sensing information corresponding to the sensing pixel of the photodiode PD2. By analogy, between a time t12 and a time t13, the image sensor may obtain the dynamic vision sensing information corresponding to the sensing pixel of the photodiode PD3 through the readout circuit 324 and the readout circuit 334. Between the time t13 and a time t14, the image sensor may obtain dynamic vision sensing information corresponding to the sensing pixel of the photodiode PD4 through the readout circuit 334 and the next-level readout circuit. Compared with some dynamic vision sensors that use two pieces of sensing information of adjacent photodiodes for differential output, this embodiment uses two pieces of sensing information of the same photodiode for differential output; therefore, the image sensor of this embodiment may effectively obtain dynamic vision sensing information with lower distortion, and the circuit area and sensor cost may be reduced by means of having adjacent sensing pixels share a readout circuit.

In addition, it is worth noting that when the image sensor of this embodiment is operated in the dynamic vision sensing mode, a plurality of photodiodes of a plurality of sensing pixels of the image sensor are exposed via a first global shutter during the first exposure period in the frame period, and all the photodiodes are exposed via a second global shutter during the second exposure period in the frame period. In addition, the image sensor may further include a plurality of readout circuits as shown in FIG. 3, and these readout circuits operate rolling readout in a plurality of readout periods in this frame period.

Figure 6:
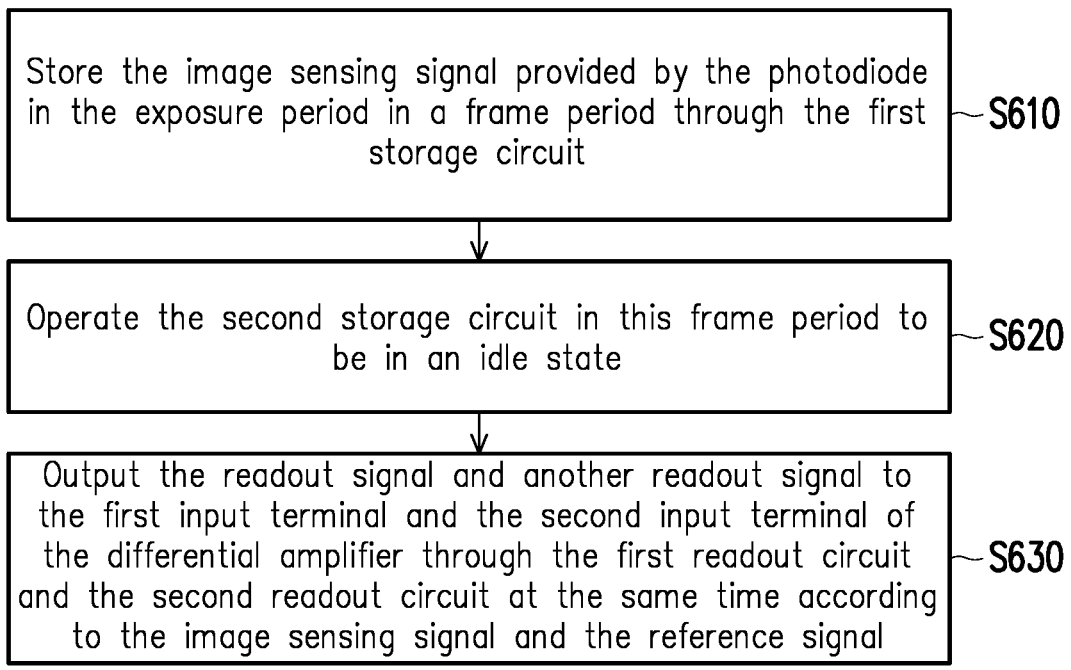
FIG. 6 is a flow chart of an image sensing method according to the second embodiment of the disclosure.
Figure 7:
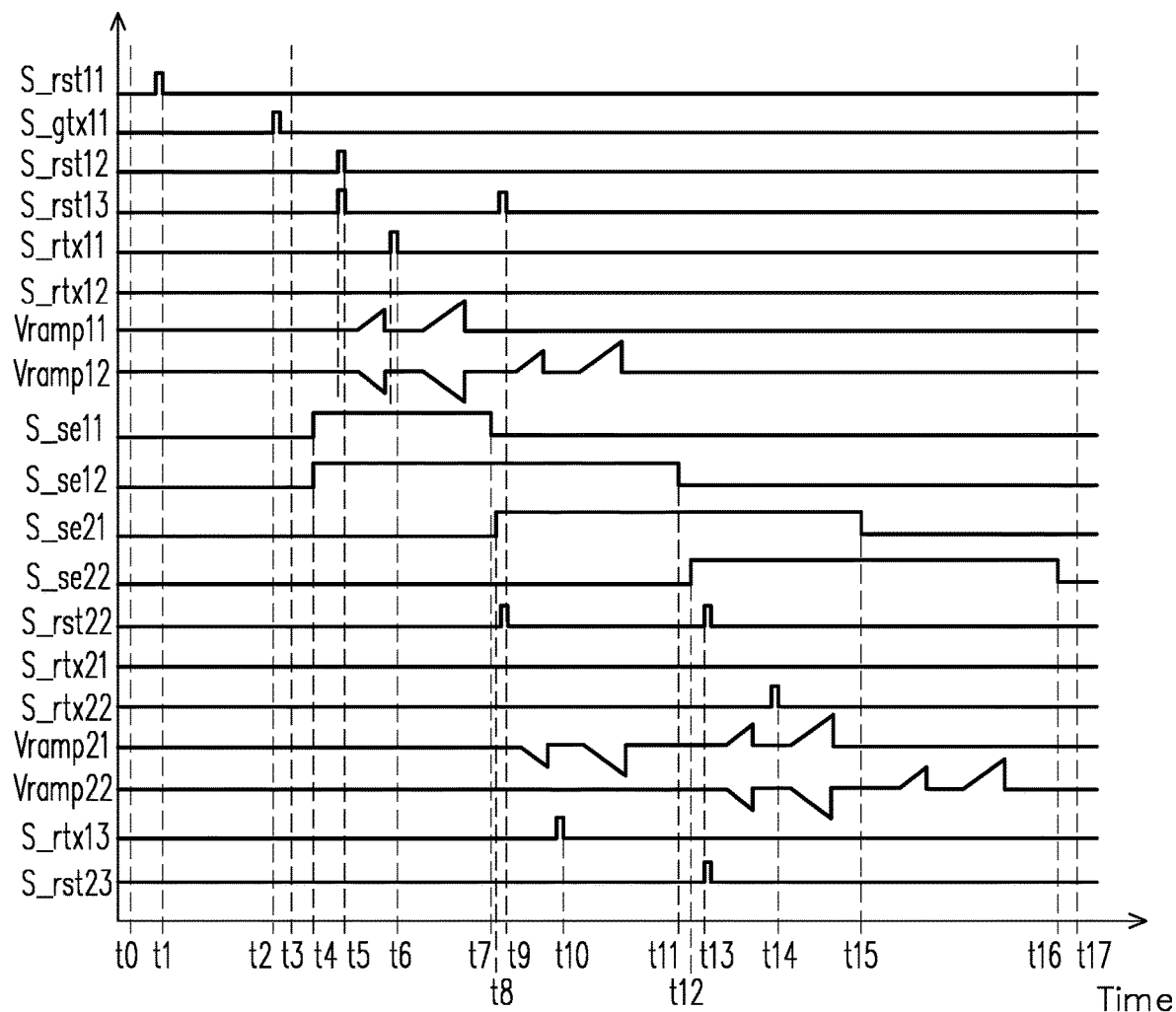
FIG. 7 is a signal time sequence diagram of the second embodiment according to the disclosure.

FIG. 6 is a flow chart of an image sensing method according to the second embodiment of the disclosure. FIG. 7 is a signal timing diagram of the second embodiment according to the disclosure. Referring to FIGS. 3 and 6 to 7, the following description takes the operation of the photodiode PD1, the storage circuit 312, the storage circuit 313, the readout circuit 314, and the readout circuit 315 as an example, and the operation of all sensing pixels of the image sensor may be deduced by analogy. The output switches gtx11, gtx12, rtx11, rtx12, rtx13, rtx21, and rtx22, the reset switches rst11, rst12, rst13, rst22, and rst23, and the selective switches se11, se12, se21, and se22 may be operated with the time sequences S_rst11, S_gtx11, S_rst12, S_rst13, S_rst22, S_rst23, S_rtx11, S_rtx12, S_rtx21, S_rtx22, S_rtx13, S_se11, S_se12, S_se21, and S_se22 as shown in FIG. 7. It is worth noting that FIG. 7 only shows part of the operational time sequences of the image sensor, and the switching signal of other switches and other signal time sequences may be deduced by analogy. The operational time sequences adapted for the image sensor of the disclosure are not limited to FIG. 7.

In step S610, the image sensor may store the image sensing signal provided by the photodiode PD1 in the exposure period in a frame period through the storage circuit 312 (a first storage circuit). In step S620, the image sensor may operate the storage circuit 313 (a second storage circuit) in this frame period to be in an idle state. In step S630, the image sensor may output the readout signal and another readout signal to the first input terminal and the second input terminal of the differential amplifier 302 through the readout circuit 314 and the readout circuit 315 at the same time according to the image sensing signal and the reference signal. It is worth noting that the above steps S610 to S630 may be executed repeatedly for other sensing pixels. However, the execution sequence of steps S610 to S630 is not limited to the above description. In an embodiment, the image sensor may execute step S610 and step S620 at the same time. Alternatively, in another embodiment, the image sensor may execute step S620 first, and then execute step S610.

Specifically, in this embodiment, when the image sensor is operated in the image sensing mode, according to the time sequences S_rst11 and S_gtx11, the photodiode PD1 is exposed at the time t1 (the photodiodes PD2 to PD4 are exposed at the same time according to the time sequences S_rst11 and S_gtx11), and the exposure operation of the photodiode PD1 is read out at the time t2 to be stored to the storage unit SN11. The storage unit SN12 is in an idle state. The output switches gtx11, gtx21, gtx31, and gtx41 may receive the same switch signal to be operated with the same time sequence S_gtx11. Therefore, the storage unit SN11 of the storage circuit 312 stores the image sensing signal provided by the photodiode PD1 in the exposure period (the time t0 to the time t3) of a frame period (the time t0 to a time t17). Next, according to the time sequences S_rst12, S_rst13, S_rtx11, and S_rtx12, the potential of the floating diffusion (FD) node on the readout path of the signal readout circuits 314 and 315 may be reset at a time t5, and the ramp signal Vramp11 and the ramp signal Vramp12 respectively have small up-ramp waveforms and down-ramp waveforms respectively between the time t5 and the time t6. Next, the information stored in the storage unit SN11 may be read out at the time t6. In this regard, the time sequences S_se11 and S_se12 are in an ON-state from the time t4 to the time t7; therefore, the readout circuit 314 may output the first readout signal to the first input terminal of the differential amplifier according to the image sensing signal. In addition, the readout circuit 315 may read out the second readout signal with background (or noise) information to the second input terminal of the differential amplifier 302 according to the reference signal (a circuit background signal or noise) on the signal transmission path of the readout circuit. Since the image sensing signal obtained by the readout circuit 314 has the same background (or noise) information, the output terminal of the differential amplifier 302 may output the image sensing signal without background noise. The readout circuit 314 may output the first readout signal according to the up ramp signal (the ramp signal Vramp 11) and the image sensing signal, and the readout circuit 315 may output the second readout signal according to the low ramp signal (the ramp signal Vramp 12) and the reference signal. Therefore, the image sensing signal provided by the photodiode PD1 may be effectively read out to the later signal processing circuit for analysis to generate the image sensing information corresponding to the sensing pixel of the photodiode PD1.

Next, regarding the exposure result of the photodiode PD2, according to the time sequences S_se12 and S_se21 being in an ON-state from the time t8 to the time t11, combined with the ramp signal Vramp12 which is converted to the up ramp signal from the time t8 to the time t11 and the ramp signal Vramp21 which is the low ramp signal from the time t8 to the time t11, the readout circuit 315 and readout circuit 324 may respectively read the image sensing signal provided by the photodiode PD2 from the time t8 to the time t11 to generate the image sensing information corresponding to the sensing pixel of the photodiode PD2. By analogy, between the time t12 and the time t15, combined with the ramp signal Vramp21 and the ramp signal Vramp22, the image sensor may obtain the image sensing information corresponding to the sensing pixel of the photodiode PD3 through the readout circuit 324 and the readout circuit 334. Between the time t15 and a time t16, the image sensor may obtain the image sensing information corresponding to the sensing pixel of the photodiode PD4 through the readout circuit 334 and the next-level readout circuit. In other words, the image sensor of this embodiment may effectively obtain image sensing information with lower distortion, and the circuit area and sensor cost may be reduced by means of having adjacent sensing pixels share a readout circuit.

In addition, it is worth noting that when the image sensor of the embodiment is operated in the image sensing mode, all photodiodes of the image sensor are exposed via a global shutter in the exposure period in this frame period. In addition, the image sensor may further include a plurality of readout circuits as shown in FIG. 3, and these readout circuits operate rolling readout in a plurality of readout periods in this frame period.

In addition, it is worth noting that when the image sensor of this embodiment is operated in the image sensing mode, half of the storage units are idle; therefore, the next global shutter exposure is operated at the same time when the readout circuit performs the rolling shutter readout, and the exposure information is stored in the idle storage units. In this way, the frame rate of image sensing may be improved. In other words, when the image sensor executes a first image sensing roll shutter readout, a second image sensing global shutter exposure may be executed at the same time.

Figure 8:
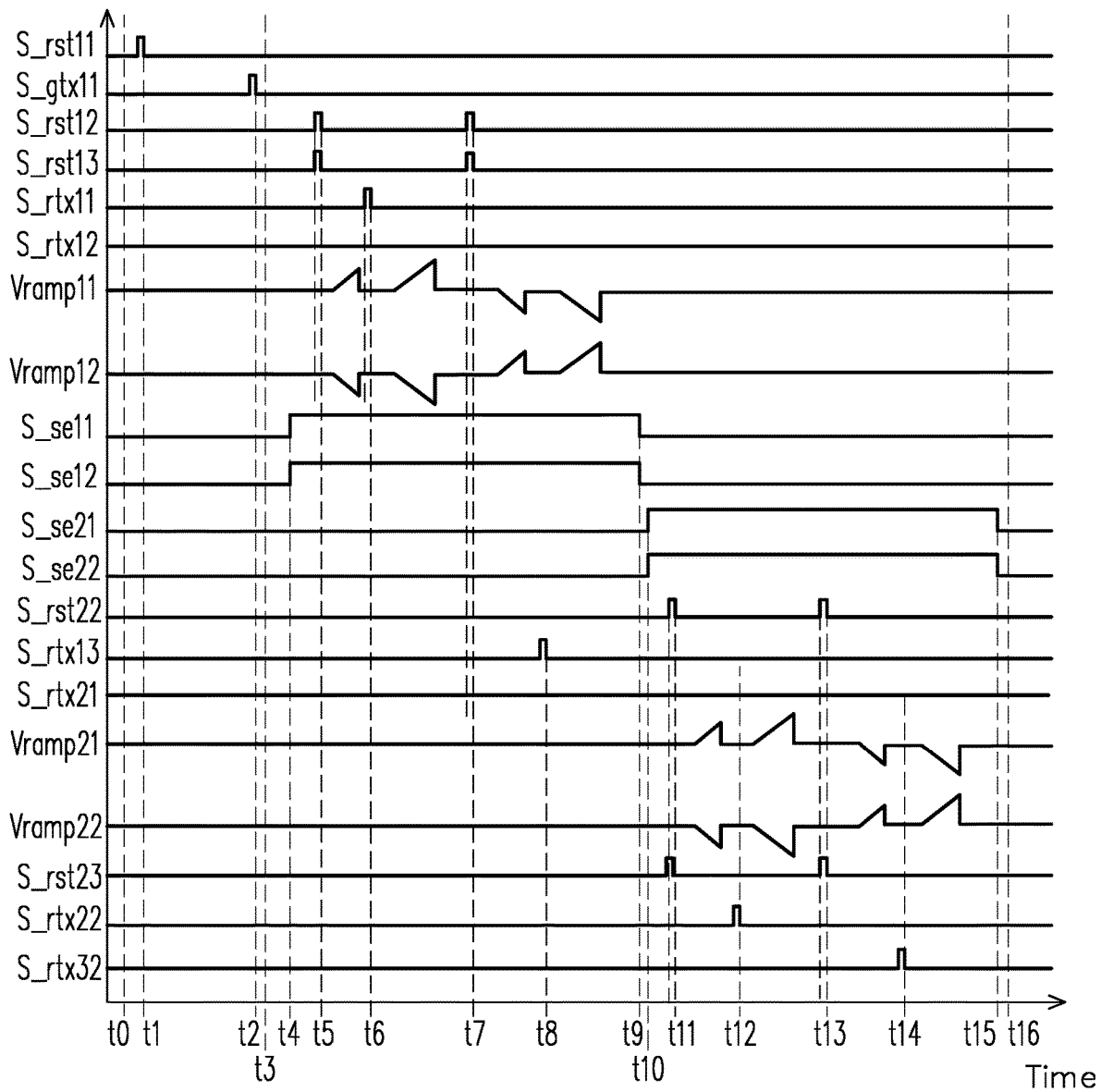
FIG. 8 is another signal time sequence diagram of the second embodiment according to the disclosure.

FIG. 8 is another signal timing diagram of the second embodiment according to the disclosure. The signal time sequence of FIG. 8 may be adapted for another embodiment of the operation process of FIG. 6. Referring to FIGS. 3 and 8, the following description takes the operation of the photodiode PD1, the photodiode PD2, the storage circuit 312, the storage circuit 313, the readout circuit 314, and the readout circuit 315 as an example, and the operation of all sensing pixels of the image sensor may be deduced by analogy. The output switches gtx11, rtx11, rtx12, rtx13, rtx21, rtx22, and rtx32, the reset switches rst11, rst12, rst13, rst22, and rst23 and the selective switches se11, se12, se21, and se22 may be operated with the time sequences S_rst11, S_gtx11, S_rst12, S_rst13, S_rst22, S_rst23, S_rtx11, S_rtx12, S_rtx13, S_rtx21, S_rtx22, S_rtx32, S_se11, S_se12, S_se21, and S_se22 as shown in FIG. 8. It is worth noting that FIG. 8 only shows part of the operational time sequences of the image sensor, while the switching signal of other switches and other signal time sequences may be deduced by analogy. The operational time sequences adapted for the image sensor of the disclosure are not limited to FIG. 8.

Specifically, in this embodiment, when the image sensor is operated in the image sensing mode, according to the time sequences S_rst11 and S_gtx11, the photodiode PD1 is exposed at the time t1 (the photodiodes PD2 to PD4 are also exposed according to the time sequences S_rst11 and S_gtx11 at the same time), and the exposure operation of the photodiode PD1 is read out at the time t2 to be stored to the storage unit SN11. The storage unit SN12 is in an idle state. The output switches gtx11, gtx21, gtx31, and gtx41 may receive the same switch signal to be operated with the same time sequence S_gtx11. Therefore, the storage unit SN11 of the storage circuit 312 stores the first image sensing signal provided by the photodiode PD1 in the exposure period (the time t0 to the time t3) of a frame period (the time t0 to a time t16). Next, according to the time sequences S_rst12, S_rst13, S_rtx11, and S_rtx12, the potential of the floating diffusion node on the signal readout path of the readout circuits 314 and 315 may be reset first at the time t5, and the ramp signal Vramp11 and the ramp signal Vramp12 respectively have small up-ramp waveforms and down-ramp waveforms respectively between the time t5 and the time t6.

Next, the information stored in the storage unit SN11 may be read out at the time t6. In this regard, according to the time sequences S_se11 and S_se12 being in an ON-state from the time t4 to the time t7, the readout circuit 314 may output the first readout signal to the first input terminal of the differential amplifier 302 according to the first image sensing signal. In addition, the readout circuit 315 may read out the second readout signal with background (or noise) information to the second input terminal of the differential amplifier according to the reference signal (circuit background signal or noise) on the signal transmission path of the readout circuit. Since the image sensing signal obtained by the readout circuit 314 has the same background (or noise) information, the output terminal of the differential amplifier 302 may output the image sensing signal without background noise. The readout circuit 314 may output the first readout signal according to the up ramp signal (the ramp signal Vramp 11) and the image sensing signal, and the readout circuit 315 may output the second readout signal according to the lower ramp signal (the ramp signal Vramp 12) and the reference signal. Therefore, the image sensing signal provided by the photodiode PD1 may be effectively read out to the later signal processing circuit for analysis to generate the image sensing information corresponding to the sensing pixel of the photodiode PD1.

Next, the exposure result of the photodiode PD2 may be read out to be stored to the storage unit SN21. The storage unit SN22 is in an idle state. Therefore, the storage unit SN21 of the storage circuit 322 stores the second image sensing signal provided by the photodiode PD2 in the exposure period (the time t0 to the time t3) of the same frame period (the time t0 to the time t16). Next, according to the time sequences S_rst12, S_rst13, S_rtx11, and S_rtx13, the potential of the floating diffusion node on the signal readout path of the readout circuits 314 and 315 may be reset at the time t7, and the ramp signal Vramp11 and the ramp signal Vramp12 are respectively converted into having small down-ramp waveforms and up-ramp waveforms between the time t7 and the time t8. Next, the information stored in the storage unit SN21 may be read out at the time t8. It should be noted that the state of the multiplexer circuit 301 at this time is to couple the readout circuit 314 to the second input terminal of the differential amplifier 302, and to couple the readout circuit 315 to the first input terminal of the differential amplifier 302 to maintain the correct polarity. In this regard, according to the time sequences S_se11 and S_se12 remaining in an ON-state from the time t7 to the time t9, the readout circuit 314 may read out another first readout signal with background (or noise) information to the second input terminal of the differential amplifier according to another reference signal (circuit background signal or noise) on the signal transmission path of the readout circuit. In addition, the readout circuit 315 may output another second readout signal to the first input terminal of the differential amplifier 302 according to the second image sensing signal. Since the image sensing signal obtained by the readout circuit 315 has the same background (or noise) information, the output terminal of the differential amplifier may output the second image sensing signal without background noise. The readout circuit 314 may output the second readout signal according to the low ramp signal (the ramp signal Vramp 11) and another reference signal, and the readout circuit 315 may output the second readout signal according to the up ramp signal (the ramp signal Vramp 12) and the second image sensing signal. Therefore, the image sensing signal provided by the photodiode PD2 may be effectively read out to the later signal processing circuit for analysis to generate the image sensing information corresponding to the sensing pixel of the photodiode PD2.

By analogy, regarding the exposure result of the photodiode PD3 and the photodiode PD4, according to the ramp signal Vramp21, the ramp signal Vramp22, the time sequence S_rst22, and the time sequence S_rst23, from the time t11 to the time t13, the image sensing information and background (or noise) information of the sensing pixel of the photodiode PD3 may be read out by the readout circuit 324 and the readout circuit 334, so as to generate the image sensing information corresponding to the sensing pixel of the photodiode PD3. From the time t13 to the time t15, the image sensing information and background (or noise) information of the sensing pixel of photodiode PD4 may be read out by the readout circuit 334 and the readout circuit 324, so as to generate the image sensing information corresponding to the sensing pixel of photodiode PD4. In other words, the image sensor of this embodiment may effectively obtain image sensing information with lower distortion, and the circuit area and sensor cost may be reduced by means of having adjacent sensing pixels share a readout circuit.

In addition, it is worth noting that when the image sensor of the embodiment is operated in the image sensing mode, all photodiodes of the image sensor in the exposure period in this frame period are exposed via a global shutter. In addition, the image sensor may further include a plurality of readout circuits as shown in FIG. 3, and these readout circuits operate rolling readout in a plurality of readout periods in this frame period.

In addition, it is worth noting that when the image sensor of this embodiment is operated in the image sensing mode, half of the storage unit are idle; therefore, the next global shutter exposure is operated at the same time when the readout circuit performs the rolling shutter readout, and the exposure information is stored in the idle storage units. In this way, the frame rate of image sensing may be improved.

In summary, the image sensor and the image sensing method of the disclosure may obtain dynamic vision sensing results with lower distortion, image sensing results with lower background noise and higher frame rates, and the image sensor of the disclosure may realize the dynamic vision sensing function and image sensing function with lower hardware cost.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. An image sensor, comprising:
   a sensing pixel, comprising:
   a photodiode;
   a first storage circuit, coupled to the photodiode;
   a first readout circuit, coupled to the first storage circuit and another second storage circuit of a previous-level sensing pixel;
   a second storage circuit, coupled to the photodiode; and
   a second readout circuit, coupled to the second storage circuit and another first storage circuit of a next-level sensing pixel,
   wherein when the image sensor is operated in a dynamic vision sensing mode, the first storage circuit stores a first dynamic vision sensing signal provided by the photodiode during a first exposure period of a first frame period, and the second storage circuit stores a second dynamic vision sensing signal provided by the photodiode during a second exposure period of the first frame period,
   wherein the first readout circuit and the second readout circuit output a first readout signal and a second readout signal to a first input terminal and a second input terminal of a differential amplifier at the same time according to the first dynamic vision sensing signal and the second dynamic vision sensing signal.

2. The image sensor according to claim 1, wherein the first readout circuit outputs the first readout signal according to a first up ramp signal and the first dynamic vision sensing signal, and the second readout circuit outputs the second readout signal according to a first down ramp signal and the second dynamic vision sensing signal.

3. The image sensor according to claim 1, further comprising a plurality of sensing pixels, wherein the sensing pixels comprise a plurality of photodiodes, wherein when the image sensor is operated in the dynamic vision sensing mode, the photodiodes are exposed via a first global shutter during the first exposure period in the first frame period, and the photodiodes are exposed via a second global shutter during the second exposure period in the first frame period,
   wherein the image sensor further comprises a plurality of first readout circuits and a plurality of second readout circuits, and the first readout circuits and the second readout circuits perform a first rolling shutter readout during a plurality of first readout periods in the first frame period.

4. The image sensor according to claim 3, wherein the sensing pixel reads out the first dynamic vision signal and the second dynamic vision sensing signal respectively stored by the first storage circuit and the second storage circuit of the sensing pixel during one of the first readout periods through the first readout circuit and the second readout circuit, and during a next one of the first readout periods, the next-level sensing pixel reads out another first dynamic vision sensing signal and another second dynamic vision sensing signal of the another first storage circuit and yet another second storage circuit of the next-level sensing pixel during the next one of the first readout periods respectively through the second readout circuit and another second readout circuit,
   wherein the another second readout circuit is further coupled to yet another first storage circuit of a sensing pixel which follows the next-level sensing pixel.

5. The image sensor according to claim 1, wherein when the image sensor is operated in an image sensing mode, the first storage circuit stores a first image sensing signal provided by the photodiode during a third exposure period in a second frame period, and the second storage circuit is an idle state, wherein the first readout circuit and the second readout circuit output a third readout signal and a fourth readout signal to the first input terminal and the second input terminal of the differential amplifier at the same time according to the first image sensing signal and a reference signal.

6. The image sensor according to claim 5, wherein the image sensor is operated in the dynamic vision sensing mode and the image sensing mode alternately.

7. The image sensor according to claim 5, wherein the first readout circuit outputs the third readout signal according to a second up ramp signal and the first image sensing signal, and the second readout circuit outputs the fourth readout signal according to a second down ramp signal and the reference signal.

8. The image sensor according to claim 5, further comprising a plurality of photodiodes, wherein when the image sensor is operated in the image sensing mode, the photodiodes are exposed via a third global shutter during the third exposure period in the second frame period, wherein the image sensor further comprises a plurality of first readout circuits and a plurality of second readout circuits, and the first readout circuits and the second readout circuits perform a second rolling shutter readout during a plurality of second readout periods in the second frame period.

9. The image sensor according to claim 8, wherein the sensing pixel reads out the first image sensing signal and the reference signal stored by the first storage circuit of the sensing pixel respectively through the first readout circuit and the second readout circuit during one of the second readout periods, and the next-level sensing pixel reads out another first image sensing signal and another reference signal stored by another first storage circuit of the next-level sensing pixel through the second readout circuit and another second readout circuit during a next one of the second readout periods, wherein the another second readout circuit is further coupled to another first storage circuit of a sensing pixel which follows the next-level sensing pixel.

10. The image sensor according to claim 9, wherein when the image sensor is operated in the image sensing mode, the second storage circuit stores a next first image sensing signal provided by the photodiode during a next third exposure period in a next second frame period, and the first storage circuit is in an idle state, wherein the first readout circuit and the second readout circuit output a next third readout signal and a next fourth readout signal to the second input terminal and the first input terminal of the differential amplifier at the same time according to a next reference signal and the next first image sensing signal.

11. The image sensor according to claim 10, wherein the next third exposure period and the second reading periods do not overlap.

12. The image sensor according to claim 10, wherein the next third exposure period and the second reading periods overlap.

13. The image sensor according to claim 1, wherein the sensing pixel further comprises:

a first reset switch, wherein a first terminal of the first reset switch is coupled to a first reset signal, and a second terminal of the first reset switch is coupled to the photodiode.

14. The image sensor according to claim 1, wherein the first storage circuit comprises:

a first output switch, wherein a first terminal of the first output switch is coupled to the photodiode; and
  a first storage unit, coupled to a second terminal of the first output switch;
  wherein the second storage circuit comprises:
  a second output switch, wherein a first terminal of the second output switch is coupled to the photodiode; and
  a second storage unit, coupled to a second terminal of the second output switch.

15. The image sensor according to claim 14, wherein the first storage unit and the second storage unit respectively are a capacitor or an unlighted photodiode.

16. The image sensor according to claim 15, wherein the first readout circuit comprises:

a third output switch, wherein a first terminal of the third output switch is coupled to the first storage unit;
  a first readout switch, wherein a control terminal of the first readout switch is coupled to a second terminal of the third output switch; and a first selective switch, wherein a first terminal of the first selective switch is coupled to a first terminal of the first readout switch;
  wherein the second readout circuit comprises:
  a fourth output switch, wherein a first terminal of the fourth output switch is coupled to the second storage unit;
  a second readout switch, wherein a control terminal of the second readout switch is coupled to a second terminal of the fourth output switch; and
  a second selective switch, wherein a first terminal of the second selective switch is coupled to a first terminal of the second readout switch.

17. The image sensor according to claim 16, wherein the first readout circuit further comprises:

a second reset switch, wherein a first terminal of the second reset switch is coupled to a second reset signal, and a second terminal of the second reset switch is coupled to the second terminal of the third output switch;
  wherein the second readout circuit further comprises:
  a third reset switch, wherein a first terminal of the third reset switch is coupled to a third reset signal, and a second terminal of the third reset switch is coupled to the second terminal of the fourth output switch.

18. The image sensor according to claim 16, wherein the first readout circuit further comprises:

a first ramp capacitor, wherein a first terminal of the first ramp capacitor is coupled to a first ramp signal, and a second terminal of the first ramp capacitor is coupled to the second terminal of the third output switch;
  wherein the second readout circuit further comprises:
  a second ramp capacitor, wherein a first terminal of the second ramp capacitor is coupled to a second ramp signal, and a second terminal of the second ramp capacitor is coupled to the second terminal of the fourth output switch.

19. An image sensing method, comprising:

when an image sensor is operated in a dynamic vision sensing mode,
  storing a first dynamic vision sensing signal provided by a photodiode during a first exposure period of a first frame period through a first storage circuit;
  storing a second dynamic vision sensing signal provided by the photodiode during a second exposure period of the first frame period through a second storage circuit; and
  outputting a first readout signal and a second readout signal to a first input terminal and a second input terminal of a differential amplifier at the same time according to the first dynamic vision sensing signal and the second dynamic vision sensing signal through a first readout circuit and a second readout circuit,
  wherein the first readout circuit is coupled to the first storage circuit and another second storage circuit of a previous-level sensing pixel, and the second readout circuit is coupled to the second storage circuit and another first storage circuit of a next-level sensing pixel.

20. The image sensing method according to claim 19, further comprising:

when the image sensor is operated in an image sensing mode,
  storing a first image sensing signal provided by the photodiode during a third exposure period in a second frame period through the first storage circuit;

operating the second storage circuit to be in an idle state in the second frame period; and outputting a third readout signal and a fourth readout signal to the first input terminal and the second input terminal of the differential amplifier according to the first image sensing signal and a reference signal through the first readout circuit and the second readout circuit.

* * * * *